US012614118B2

(12) United States Patent　(10) Patent No.: US 12,614,118 B2
Dent et al.　(45) Date of Patent: *Apr. 28, 2026

(54) AUTOMATED MACHINE LEARNING SYSTEM

(71) Applicant: QlikTech International AB, Lund (SE)

(72) Inventors: Killian B. Dent, Sandy, UT (US); James M. Friedman, Ormond Beach, FL (US); Allan D. Johnson, Lehi, UT (US); Shauna J. Moran, Taylorsville, UT (US); Tyler P. Cooper, Bluffdale, UT (US); Chris K. Knoch, Sandy, UT (US); Nicholas R. Magnuson, Park City, UT (US); Daniel J. Wallace, Salt Lake City, UT (US)

(73) Assignee: QlikTech International AB, Lund (SE)

( * ) Notice: Subject to any disclaimer, the term of this patent is extended or adjusted under 35 U.S.C. 154(b) by 227 days.

This patent is subject to a terminal disclaimer.

(21) Appl. No.: 18/610,727

(22) Filed: Mar. 20, 2024

(65) Prior Publication Data

US 2024/0346375 A1　Oct. 17, 2024

Related U.S. Application Data

(63) Continuation of application No. 16/416,773, filed on May 20, 2019, now Pat. No. 11,954,565.

(60) Provisional application No. 62/694,908, filed on Jul. 6, 2018.

(51) Int. Cl.
*G06N 20/00*　(2019.01)
*G06F 9/50*　(2006.01)
*G06N 3/08*　(2023.01)
*G06N 20/20*　(2019.01)

(52) U.S. Cl.
CPC ........... *G06N 20/00* (2019.01); *G06F 9/5011* (2013.01); *G06N 3/08* (2013.01); *G06N 20/20* (2019.01)

(58) Field of Classification Search
None
See application file for complete search history.

(56) References Cited

U.S. PATENT DOCUMENTS

2015/0379429 A1　12/2015　Lee et al.
2018/0060759 A1　3/2018　Chu et al.
2018/0096078 A1　4/2018　Leeman-Munk et al.

OTHER PUBLICATIONS

International Search Report and Written Opinion issued in related application No. PCT/2019/040594 mailed Oct. 4, 2019.

(Continued)

*Primary Examiner* — Vincent Gonzales
(74) *Attorney, Agent, or Firm* — Ballard Spahr LLP

(57) ABSTRACT

An example method may include receiving, via a graphical user interface, credentials for connecting to a data store containing a plurality of datasets and connecting to the data store using the credentials. A selection of a target metric to predict using the machine learning model can be received, via the graphical user interface, and datasets included in the plurality of datasets that correlate to the target metric can be identified by analyzing the datasets to identify an association between the target metric and data contained within the datasets. The datasets can be input to the machine learning model to train the machine learning model to generate predictions of the target metric, and the machine learning model can be deployed to computing resources in a service provider environment to generate predictions associated with the target metric.

20 Claims, 12 Drawing Sheets

(56)　　　　　　References Cited

OTHER PUBLICATIONS

TensorFlow Playground, https://playground.tensorflow.opg, archived web page from archive. org, available at https://web.archive.org /web/20180307005040/https://playground.tensorflow.org. Screenshot from Mar. 7, 2018, accessed May 25, 2023. 2 pages. (Year: 2018).
James G, Witten D, Hastie T, Tibshirani R. An introduction to statistical learning. New York: Springer. Jun. 2013. Corrected 8th printing 2017. 441 pages. (Year: 2013).
SAS Model Manager 3.1 User's Guide, SAS Publishing, 2nd electronic book Apr. 2012. 436 pages. (Year: 2012).
Smith M. Using the Magic Pocket: A Dropbox Guide. XP002680091. Nov. 23, 2010:1-36. (Year: 2010).
International Search Report issued in related application No. PCT/ US2019/040594 dated Oct. 4, 2019.
TensorFlow Playground, <https://playground.tensorflow.opg>, archived web page from archive.org <http://archive.org>, available at <https:// web.archive.org> /web/20180307005040/<https://playground. tensorflow.org>. Screenshot from Mar. 7, 2018, accessed May 25, 2023. 2 pages. (Year: 2018).

Client Device

GUI  204     Select Target Metric to Predict 408

406

| | Account ID<br>string | Unique Values<br>3,160 | Null Entries<br>0 |
| | State<br>string | Unique Values<br>50 | Null Entries<br>0 |
| | Promo Plan<br>string | Unique Values<br>2 | Null Entries<br>0 |
| | Customer Service Rank<br>float | Unique Values<br>160 | Null Entries<br>0 |
| ☑ | Cancellations<br>integer | Unique Values<br>2 | Null Entries<br>0   404 |

FIG. 4

Client Device

GUI 204     Target Metric Correlation 502

Correlation between Cancellations and other prediction drivers

506 →

| Plan Type | 0.49 |

| Repeat Customer | 0.26 |

| Base Fee | 0.2 |

| Promo Plan | 0.1 |

| Taxes & Fees | 0.06 |

| Usage | 0.04 |

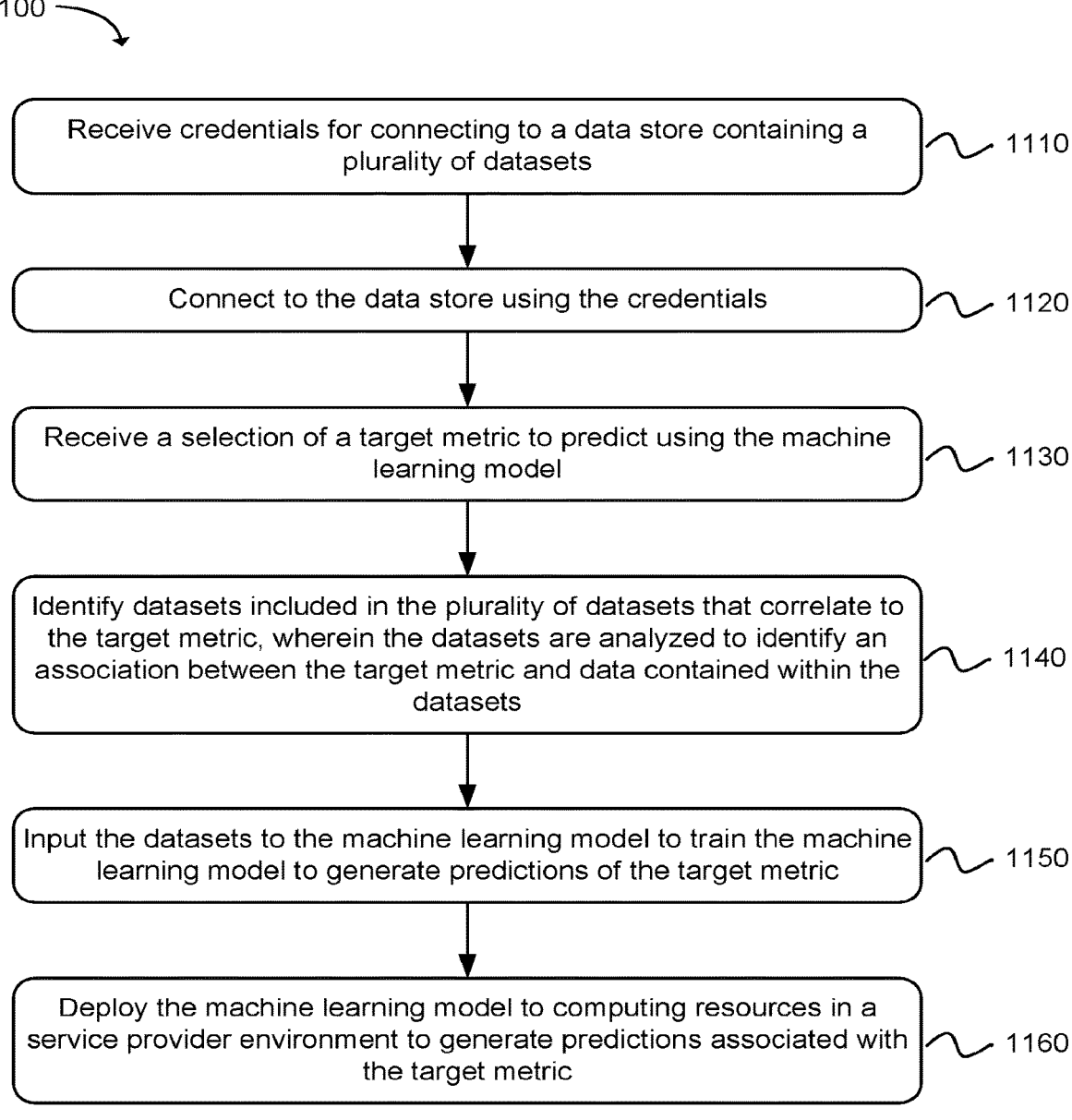

Receive credentials for connecting to a data store containing a plurality of datasets ⟩⁓ 1110

Connect to the data store using the credentials ⟩⁓ 1120

Receive a selection of a target metric to predict using the machine learning model ⟩⁓ 1130

Identify datasets included in the plurality of datasets that correlate to the target metric, wherein the datasets are analyzed to identify an association between the target metric and data contained within the datasets ⟩⁓ 1140

Input the datasets to the machine learning model to train the machine learning model to generate predictions of the target metric ⟩⁓ 1150

Deploy the machine learning model to computing resources in a service provider environment to generate predictions associated with the target metric ⟩⁓ 1160

FIG. 11

AUTOMATED MACHINE LEARNING SYSTEM

CROSS-REFERENCE TO RELATED APPLICATIONS

This application is a continuation of U.S. application Ser. No. 16/416,773, filed on May 20, 2019, which claims priority to U.S. App. No. 62/694,908, filed on Jul. 6, 2018, both of which are incorporated by reference in their entireties herein.

BACKGROUND

In the technological field of machine learning (ML) and predictive analytics, algorithms and statistical models are used to perform tasks by relying on data patterns and derived inference of historical data. Machine learning algorithms build a mathematical model of sample data, known as training data, to make predictions or decisions without being explicitly programmed to perform the task. Machine learning algorithms can be used in a wide variety of applications to perform a task that would otherwise be infeasible to perform using an algorithm of specific instructions. Machine learning is closely related to computational statistics, which focuses on making predictions using computers.

Machine learning tasks can be classified into several broad categories. In supervised learning, the algorithm builds a mathematical model from a set of data that contains both the inputs and the desired outputs. Classification algorithms and regression algorithms are types of supervised learning. Classification algorithms can be used when the outputs are restricted to a limited set of values. In unsupervised learning, the algorithm builds a mathematical model from a set of data which contains only inputs and no desired output labels. Unsupervised learning algorithms can be used to find structure in the data, like grouping or clustering of data points. Unsupervised learning can discover patterns in the data and can group the inputs into categories, as in feature learning.

BRIEF DESCRIPTION OF THE DRAWINGS

FIG. 4 is a diagram illustrating an example target metric selection screen of a GUI used to select a target metric to predict using a machine learning model.

FIG. 5 is a diagram that illustrates an example target metric correlation screen of a GUI used to display the magnitude and direction of correlation of a target metric to prediction drivers.

FIG. 11 is a flow diagram illustrating an example method for automating deployment of a machine learning model.

DETAILED DESCRIPTION

Figure 1:
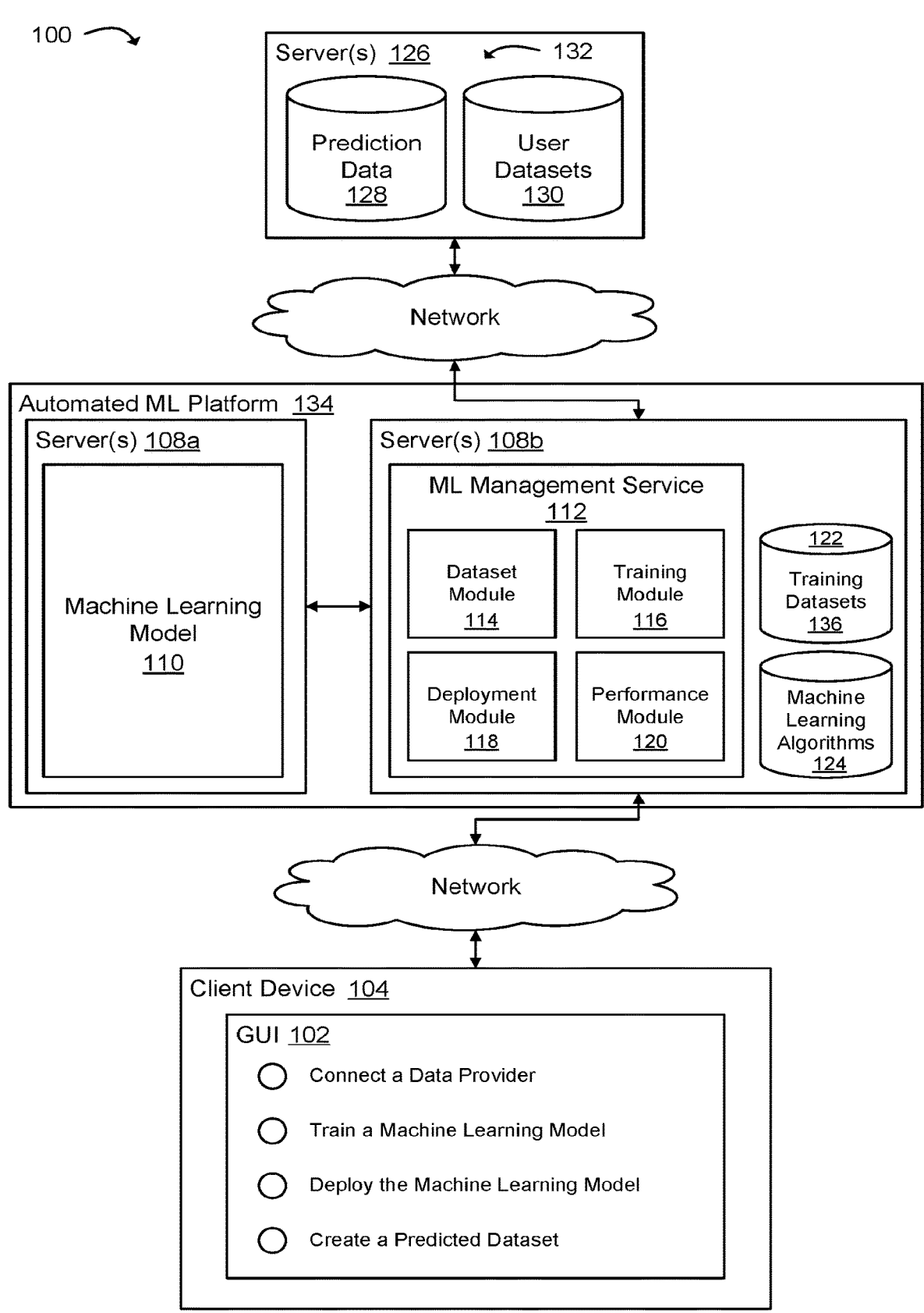
FIG. 1 is a block diagram illustrating an example system for automated machine learning model training and deployment.

Technologies are described for automating machine learning training and deployment. In one example of the technology, an automated machine learning (ML) platform can be used to train and deploy machine learning models to generate predictions for target metrics. A machine learning model can be trained using one or more user-provided datasets, and the machine learning model can be deployed to a service provider environment (e.g., a public "cloud" environment) to generate predictions for the target metric, which can be written out to a user data store for use by a user.

A user can be provided access to the automated ML platform via a graphical user interface. The graphical user interface may be configured to allow the user to specify a user data store containing datasets for training a machine learning model and provide user-credentials for the data store. The automated ML platform can be configured to retrieve the datasets from the data store using the user-credentials and analyze the datasets to identify an association between the target metric and the data contained within the datasets. For example, dataset keys, tags, metadata, and the like can be analyzed to identify associations between the target metric and the dataset. The graphical user interface can be used to further refine which datasets are to be used to train the machine learning model, and the machine learning model can be trained using the datasets to generate predictions of the target metric.

In one example, the automated ML platform may provide a user with the ability to train multiple machine learning models, compare the performance of the machine learning models to generate predictions of the target metric, and select a machine learning model based on performance as compared to the other machine learning models. In another example, the automated ML platform may provide a user with the ability to create multiple versions of a particular machine learning model and select a version of the machine learning model based on the performance of the version as compared to other versions of the machine learning model. For example, the automated ML platform may be configured to determine an influence of a prediction driver (e.g., a data element in a dataset used to predict a target metric), and the user, via the graphical user interface, can adjust the influence of the prediction driver (by modifying values of the prediction driver) to predict the target metric, and create a version of the machine learning model that uses the adjusted prediction driver.

After training the machine learning model, the graphical user interface can be used to deploy the machine learning model to a service provider environment (e.g. a public "cloud" environment) where the machine learning model can be executed on computing resources in the service provider environment. The machine learning model can be accessed and executed using the graphical user interface, and predicted target metrics generated by the machine learning model can be written to a user accessible data store located in a user's network or within the service provider environment.

In the past, the field of machine learning has lacked business intelligence tools and/or visualization tools that allow non-expert users to run more advanced analytics calculations. Past technologies for machine learning and predictive analytics have been targeted toward users who typically have significant experience in this field, such as data scientists. Often times, users seeking to understand drivers affecting their businesses are non-expert users, such as data analysts and/or business analysts, who lack the appropriate background and/or computer coding background to readily utilize machine learning technologies. Nevertheless, these non-expert users are often the ones tasked with making decisions affecting their organizations. Therefore, having a non-expert-user-friendly automated ML platform capable of performing advanced analytics calculations would be beneficial to business decision makers to enable ready access to information relevant to the decisions being made. The present technology provides an automated ML platform that may be readily utilized by users, who may lack an expert-level background in data science and machine learning, to train and deploy a machine learning model and use predicted target metrics in organization based decisions.

To further describe the present technology, examples are now provided with reference to the figures. FIG. 1 is a block diagram illustrating an example of a system 100 on which the present technology may be executed. As illustrated, the system 100 can include an automated ML platform 134 that includes components to train a machine learning model 110 to generate predictions of a target metric and deploy the machine learning model 110 for use in a production environment. Components of the automated ML platform 134 may be hosted on computing resources located, in one example, in a service provider environment (e.g., a "cloud" environment), or in another example, in a private network or colocation network environment.

A graphical user interface (GUI) 102 may provide users with access to the automated ML platform 134 and various tools included in the automated ML platform 134. In one example, the GUI 102 can be implemented using a web application configured to execute client-side logic in a browser application on a client device 104. In another example, the GUI 102 can be implemented using an application hosted on a client device 104 that connects to the automated ML platform 134 over one or more networks. The GUI 102 may allow a user to access the automated ML platform 134 hosted on a server 108 b and to build a machine learning model 110 using a machine learning (ML) management service 112.

The ML management service 112 may include tools for analyzing user datasets 130, training machine learning models using various machine learning algorithms 124, comparing the performance of machine learning models of various types and versions, adjusting prediction drivers used by a machine learning model 110 to generate predictions of a target metric and executing scenarios based on the adjusted prediction drivers, as well as other tools. The ML management service 112 may contain modules configured to provide the tools for building, training, analyzing, and deploying machine learning models. The modules can include a dataset module 114, a training module 116, a deployment module 118, a performance module 120, and other modules.

The dataset module 114 can be configured to obtain user datasets 130 from one or more user data stores 132 for use in training a machine learning model 110. A user data store 132 can be hosted on computing resources (e.g., server(s) 126) located in a service provider environment, located in a user's private network, or located in other locations, as can be appreciated. A user dataset 130 obtained from a user data store 132 can comprise structured data (e.g., categorized and/or formatted data) having data elements which can be analyzed to identify associations between the data elements. Illustratively, data contained in a user dataset 130 may include organizational data which can be analyzed to determine whether the data can be used to train a machine learning model 110 to perform predictive analysis of various aspects for an organization. The dataset module 114 in can connect to a user data store 132 using credentials provided by a user and obtain a user dataset 130 from the user data store 132. The user datasets 130 may be obtained from one or more data store locations, including a service provider environment that hosts a managed data store service used to manage the user datasets 130, and/or a data store located in a user's private network. For example, a user, via the GUI 102, may specify a location of a user data store 132 (e.g., identify a managed data store service or a data store URI (Uniform Resource Identifier)) and provide credentials for accessing the user data store 132 (e.g., an access key or a connection string).

In one example, the dataset module 114 may be configured to retrieve metadata for the user datasets 130 and the metadata can be displayed to the GUI 102 to allow a user to select which user datasets 130 to use to train a machine learning model 110. A user dataset 130 retrieved from a user data store 132 can be stored on the automated ML platform 134 in a sync data store 122 as training datasets 136. In one example, the dataset module 114 synchronizes user datasets 130 contained in a user data store 132 with training datasets 136 stored in the sync data store 122. For example, the dataset module 114 may periodically connect to a user data store 132 using credentials provided by a user and copy a user dataset 130 contained in the user data store 132 to the sync data store 122. In one example, in addition to obtaining user datasets 130 from user data stores 132, a user can upload a training dataset 136 to the automated ML platform 134 using the GUI 102.

A user, via the GUI 102, can specify a target metric to predict using a machine learning model 110. A target metric may be any data point that can be derived from predictive analysis of a dataset. A user can select a data element included in a user dataset 130 as a target metric. As a non-limiting example, a user may select the data element "cancellations" from a customer dataset as a target metric. In one example, data elements included in a dataset can be displayed to the GUI 102 and a user can select a data element as a target metric.

The dataset module 114, in one example, can be configured to analyze data elements contained in a user dataset 130 to determine whether the data elements correlate to a target metric. As a non-limiting example where the data element "cancellations" has been selected as the target metric, the dataset module 114 can analyze other data elements in a user dataset 130 to determine whether the other data elements relate to "cancellations". The dataset module 114 can be configured to select the data elements that correlate to the target metric and include the data elements in a training dataset 136. In another example, dataset module 114 can be configured to analyze a training dataset 136 to identify data elements that do not correlate to a target metric and remove the data elements from the training dataset 136. Also, in some examples, the dataset module 114 can be configured to perform actions that prepare a training dataset 136 to be used to train a machine learning model 110, such as, but not limited to, replacing null values with a placeholder value, normalizing data, standardizing data, aggregating data, detecting and removing outlier data, dividing datasets into training datasets and testing datasets, as well as other actions. For example, the dataset module 114 can be configured to analyze a training dataset 136 based on an action to be performed (e.g., normalizing, aggregating, dividing, etc.) and perform the action based on the analysis. In another example, a user can use the GUI 102 to evaluate a training dataset 136 and use dataset preparation tools (e.g., normalization tools, aggregation tools, dataset dividing tools, etc.) provided by the dataset module 114 to prepare the training dataset 136 for training a machine learning model 110.

In one example, the dataset module 114 can be configured to analyze a data element in a training dataset 136 to determine usefulness of a data element to predict a target metric and remove the data element from the training dataset 136 when the data element is determined to be not useful in predicting the target metric. For example, a data element can be analyzed to determine whether an occurrence of unique values (high cardinality, e.g., where each row contains a unique value for the column), null values (e.g., a column in a dataset contains a high number of null values), single value (e.g., a column in a dataset contains the same value in each row), and/or other values represented by the data element warrant removing the data element from a training dataset 136, and removing the data element from the training dataset 136 when the determination warrants removal of the data element. In another example, statistical information (e.g., a number of unique values, null values, and/or other values) for data elements included in a training dataset 136 can be displayed in the GUI 102 to allow a user to evaluate whether a data element may be useful in predicting a target metric. The user can select a data element determined by the user to be not useful for predicting the target metric and the dataset module 114 can remove the data element from the training dataset 136. Alternatively, a user can use the GUI 102 to select data elements to include in a training dataset 136 and the dataset module 114 can remove unselected data elements from the training dataset 136.

The training module 116 can be used to train a machine learning model 110 to predict a target metric using one or more training datasets 136 obtained by the dataset module 114 and/or uploaded to the ML management service 112 by a user. In one example, the training module 116 can be configured to select one or more machine learning types or algorithms 124 to use to build machine learning models based in part on a target metric to be predicted. For example, the training module 116 may associate a target metric with a machine learning algorithm 124 (e.g., regression, classification, clustering, etc.) to use to build a machine learning model 110. In one example, the training module 116 may use a data type (e.g., real, integer, boolean, etc.) of a target metric to select a machine learning algorithm. Illustratively, the training module 116 may select a classification algorithm when a target metric has a string or boolean data type, and may more specifically select a regression algorithm when a target metric has an integer or float data type. In another example, a listing of machine learning algorithms 124 that are available to train a machine learning model 110 can be displayed to the GUI 102, and a user can select a machine learning algorithm 124 to use to train a machine learning model 110. After a machine learning algorithm 124 has been selected, the training module 116 can provide one or more training datasets 136 to the machine learning algorithm 124 and can initiate execution of the training of the machine learning algorithm 124 to output a deployable executable machine learning model 110 which can be used to predict a target metric.

In one example, the training module 116 can be configured to train multiple machine learning models in parallel using different types of machine learning algorithms 124, and the training module 116 can be configured to select the best performing machine learning model for deployment to a production server 108 _a_. As an illustration, the training module 116 can be used to train a first machine learning model using an XGBoost classifier algorithm and a second machine learning model using a random forest classifier algorithm. Performance of the first and second machine learning models can be compared by generating a prediction score for each machine learning model and comparing the prediction scores. For example, the performance module 120 can be used to generate prediction scores representing the performance of the first and second machine learning models to predict a target metric, and the training module 116 can compare the predictions scores and select the machine learning model that has the best prediction score. As an illustration, the performance module 120 can calculate an Fi score for each machine learning model and provide the Fi score to the training module 116, which can then select the machine learning model that has an Fi score representing the better prediction performance. In another example, the prediction scores for the machine learning models can be displayed to the GUI 102 and a user can select a machine learning model based in part on the prediction scores. As can be appreciated, any number of machine learning models can be trained using various machine learning algorithms 124 and performance of the machine learning models can be compared.

The training module 116, in some examples, can be used to generate multiple versions of a machine learning model 110 using modified training datasets 136, and the performance module 120 can be used to calculate prediction scores representing the performance of the versions of the machine learning model 110. For example, the training module 116 can be used to train a first version of a machine learning model using a training dataset 136. A user can then modify the training dataset 136 by changing one or more values associated with a prediction driver (data elements within a training dataset 136) included in the training dataset 136, and the training module 116 can be used to train a second version of the machine learning model. The performance module 120 can be used to calculate prediction scores for the first and second versions of the machine learning model 110 and the prediction scores can be displayed in the GUI 102 to allow a user to select a version of the machine learning model 110 to deploy based in part on the prediction scores.

As described above, the performance module 120 can be configured to generate a prediction score for a machine learning model 110 which can be used to evaluate performance of the machine learning model 110. Various methods can be used to generate a prediction score, including: Fi score (also F-score or F-measure), area under curve (AUC) metric, receiver operating characteristic (ROC) curve metric, relevance and ranking (in information retrieval), as well as other scoring methods.

In one example, the performance module 120 can be used to calculate the influence of prediction drivers on a target metric prediction. Prediction drivers may comprise individual data elements within a training dataset 136 used to train a machine learning model 110 to generate predicted target metrics. The performance module 120 can calculate the influence of a prediction driver by determining the statistical correlation between a candidate prediction driver and the target metric. The influence of a prediction driver on target metric prediction can be represented using a classification (e.g., Low, Medium, or High), a percentage, or another value. Prediction drivers can be ranked based on the influence of the prediction drivers to generate the prediction of the target metric, and the ranked prediction drivers can be displayed to the GUI 102 to allow a user to view the influence of the prediction drivers on target metric prediction.

The performance module 120, in one example, can be used to execute prediction scenarios based on adjustments to the influence of one or more prediction drivers to predict a target metric. A user can adjust or change the influence of a prediction driver to predict a target metric by submitting a change in amount, weight, degree, etc. via the GUI 102, and the adjustment can be applied to the prediction driver by modifying data records associated with the prediction driver in proportion to the adjustment. As an illustration, a prediction driver can be displayed to the GUI 102 to show an influence of the prediction driver on predicting a target metric, and a user can adjust the influence of the prediction driver using an input control (e.g., a slider control, increment and decrement control, input box, and the like) included in the GUI 102. The performance module 120 can be configured to apply the adjustment made by the user to records associated with the prediction driver, such that the records can be modified by overwriting, removing, and/or creating records in proportion to the adjustment to the prediction driver. As a non-limiting example, decreasing the influence of the prediction driver "Base Fee" on predicting a target metric by 10% may include overwriting 10% of base fee records in a dataset with a substitute value, and executing the machine learning model 110 using the modified dataset to determine the change in influence of the "Base Fee" prediction driver on predicting a target metric.

In one example, a user may adjust a prediction driver based in part on a ranking of the prediction driver's influence on predicting a target metric. As an illustration, a user may adjust a prediction driver's ranking from high to medium using controls included in the GUI 102 and the performance module 120 may be used to modify records associated with the prediction driver in proportion to the adjustment of the ranking.

The performance module 120 can be configured to calculate an impact of an adjustment to a prediction driver on predicting a target metric, and information about changes in performance of the machine learning model 110 that result from the adjustment can be displayed to the GUI 102 to allow a user to evaluate the impact of the prediction driver adjustment on predicting the target metric. For example, the performance module 120 can be used to calculate a before adjustment prediction score and an after adjustment prediction score, and the prediction scores can be compared to determine a change in performance of the machine learning model 110 to predict a target metric. The before and after prediction scores can be displayed to the GUI 102, and a user can evaluate the before and after prediction scores to determine a performance change of the machine learning model 110. A user can save adjustments made to a prediction driver and deploy a machine learning model 110 to a production environment for execution using the prediction driver adjustment.

The deployment module 118 can be configured to deploy a machine learning model 110, which has been trained to predict a target metric, to a production environment for execution. In one example, a file package containing a machine learning model executable and dependencies can be deployed to a server 108 *a* included in the automated ML platform 134. The server 108 *a* may be a computing resource included in a service provider environment or cloud environment (e.g., private cloud) configured to host the machine learning model 110. Prediction data 128 generated by the machine learning model 110 can be sent to a user data store 132 to allow a user to access the prediction data. In another example, a machine learning model 110 can be deployed to a user's computing resources. For example, the deployment module 118 can deploy a file package containing a machine learning model executable and dependencies to a server included in a user data center.

The various processes and/or other functionality contained within the system 100 may be executed on one or more processors that are in communication with one or more memory modules. The system 100 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the system 100 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network can be used for communications between components of the system 100. The network may include any useful computing network, including an intranet, the Internet, a local area network, a wide area network, a wireless data network, or any other such network or combination thereof. Components utilized for the network may depend at least in part upon the type of network and/or environment selected. Communication over the network may be enabled by wired or wireless connections and combinations thereof.

FIG. 1 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1 illustrates an example of a system that may implement the techniques above, many other similar or different environments are possible. The example environment discussed and illustrated above is merely representative and not limiting.

Figure 2:
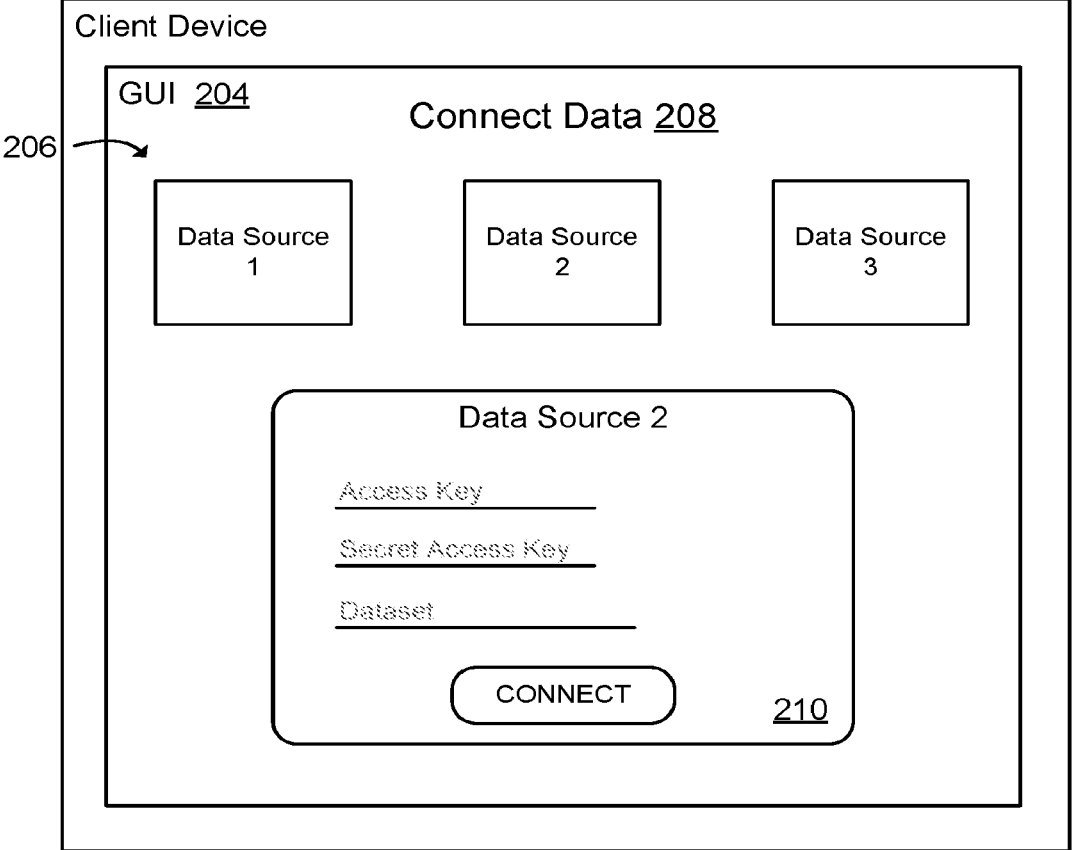
FIG. 2 is a diagram illustrating an example connect data screen of a GUI used to select data sources containing datasets for use in training a machine learning model.

FIGS. 2-10 illustrate example screens of a GUI 204 which can be used as part of an automated ML platform workflow for developing and deploying a machine learning model. FIG. 2 illustrates a connect data screen 208 of the GUI 204 that can be used to select one or more data sources 206 containing datasets for use in training a machine learning model. The connect data screen 208 may provide a user with the ability to view one or more data sources owned by the user or the user's organization. As illustrated, the connect data screen 208 can display a plurality of data sources 206 where a user may have data stored, and on which the user may desire to run analytic calculations. Selection of a particular data source 206 may provide a user the ability to input appropriate credentials to access data stored in association with a data provider, such as a service provider who provides a managed storage service through a web service interface. For example, the connect data screen 208 can include a credentials interface 210 that allows a user to input credentials for accessing a selected data source 206 and connect to the selected data source 206. Once the appropriate credentials have been input and a connection to the data provider has been made, data from the data source 206 can be transferred to a data store on the automated ML platform, as described earlier. After the data from the selected data sources 206 has been transferred to the automated ML platform, the user may select one or more datasets for training a machine learning model.

Figure 3:
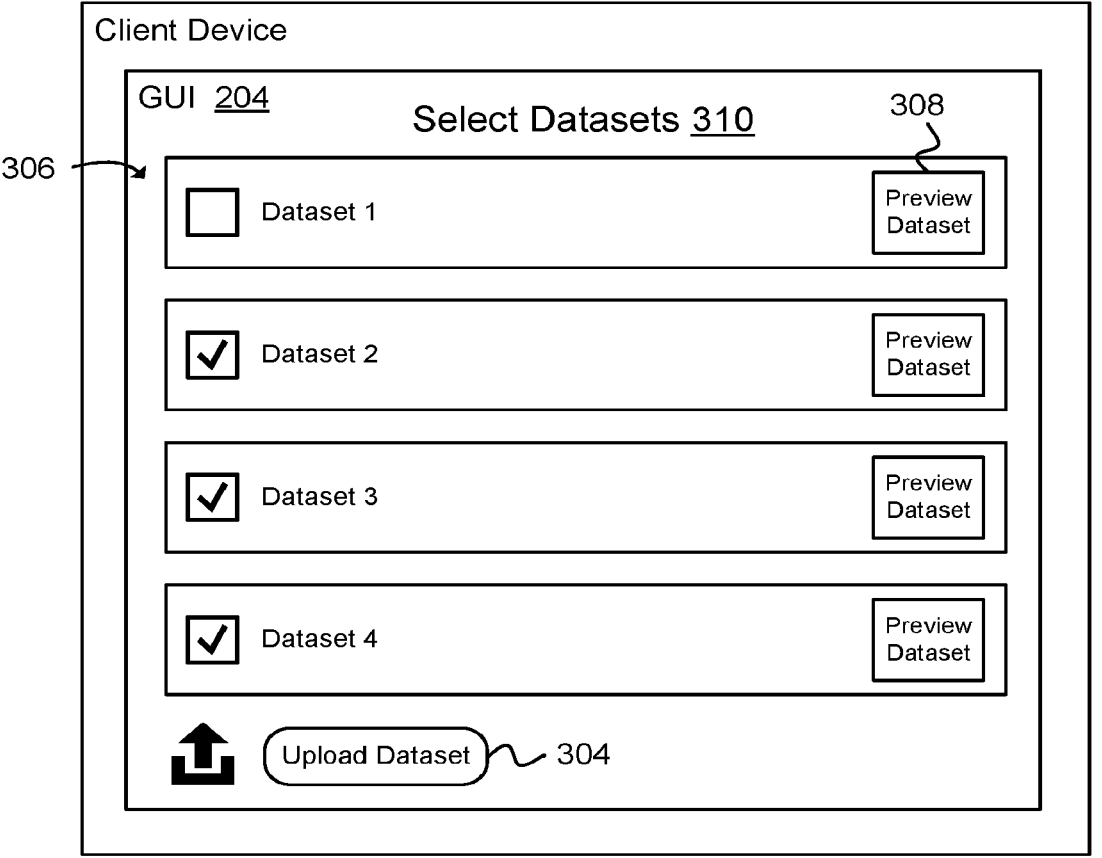
FIG. 3 is a diagram that illustrates an example dataset selection screen of a GUI used to display datasets obtained from a user data store used to train a machine learning model.

FIG. 3 illustrates that a dataset selection screen 310 of the GUI 204 can be used to display datasets 306 obtained from a user data store to a user and allow the user to select which datasets 306 to use to train a machine learning model. The select datasets screen 310 can include a "Preview Dataset" indicator 308 which can be selected to display at least a portion of data included in a dataset 306, allowing a user to evaluate the data and make a decision whether to use the dataset 306 to train a machine learning model. In one example, the select datasets screen 310 can include an option (not shown) that allows a user to view a schema of a dataset 306, which the user can evaluate as part of a decision whether to use the dataset 306 to train a machine learning model. In some examples, the select datasets screen 310 can include an upload control 304 that allows a user to upload a dataset to the automated ML platform for use in training a machine learning model.

After selecting datasets to use to train the machine learning model, a target metric selection screen 408 of the GUI 204 illustrated in FIG. 4 can be used to display metrics 406 included in the datasets and the user can select one of the metrics 406 as a target metric 404 to predict using the machine learning model. As a non-limiting example, as illustrated in FIG. 4, a user can select the metric "Cancellations" as the target metric 404 and a machine learning model can be trained to predict customer cancellations. The automated ML platform may include various analysis tools which can be used to analyze the datasets and provide a user with prediction driver analysis that can be used to refine the data associated with the prediction drivers in order to improve the performance of the machine learning model. Prediction drivers may be data elements or categories of data in the datasets used by the machine learning model to predict the target metric 404. The automated ML platform may include a correlation analysis tool which can be used to analyze datasets and identify correlations between prediction drivers and a target metric 404.

Correlation metrics for the prediction drivers can be calculated, and as shown in FIG. 5, the correlation metrics for the prediction drivers 506 can be displayed to a target metric correlation screen 502 of the GUI 204 to allow the user to view the magnitude and direction of correlation of the target metric to the prediction drivers 506. In one example, the target metric correlation screen 502 can be used to display a correlation matrix (not shown) that illustrates the correlation between each column in a dataset with every other column in the dataset.

Figure 6:
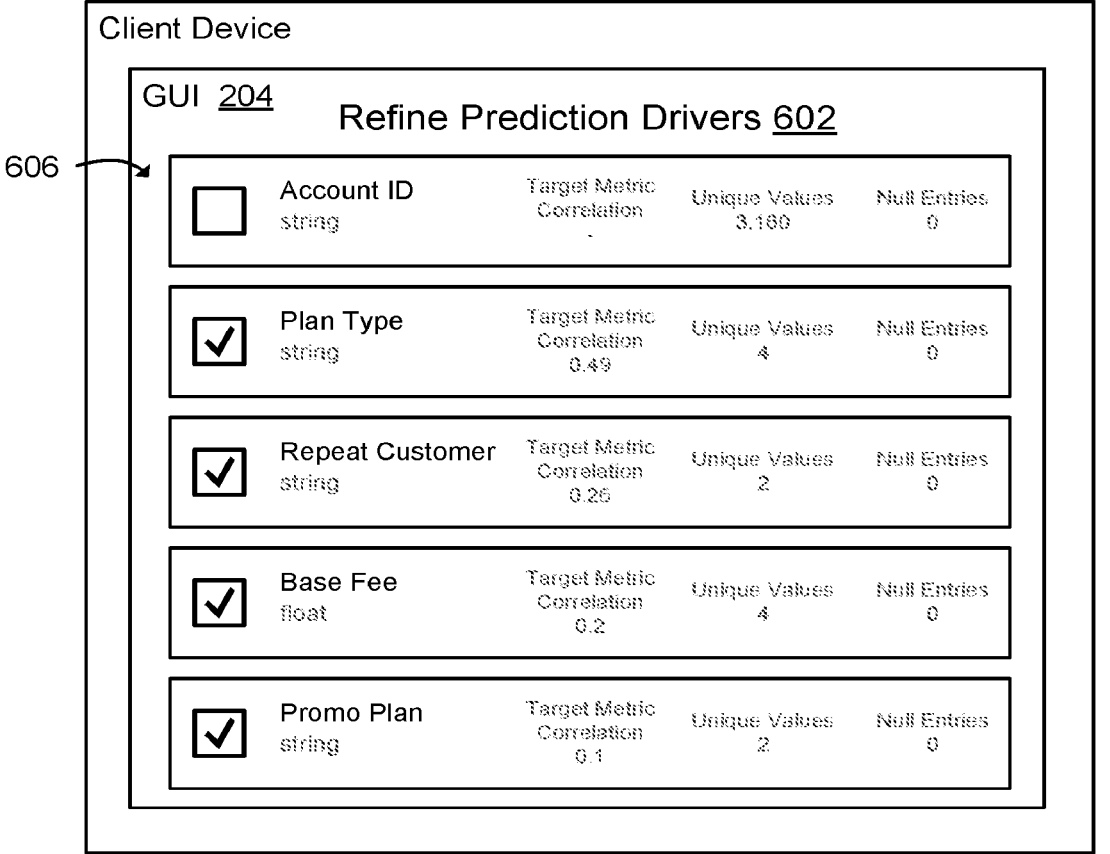
FIG. 6 is a diagram illustrating an example of a refine prediction drivers screen of a GUI used to evaluate correlation information and determine whether to remove a prediction driver from being used to predict a target metric.

The automated ML platform may include a refine drivers tool for evaluating the usefulness of prediction drivers to predict a target metric and removing prediction drivers determined to not be useful for predicting the target metric. As shown in FIG. 6, correlation information for a prediction driver 606 can be displayed on a refine prediction drivers screen 602 of the GUI 204, and the user can evaluate the correlation information to determine whether to remove the prediction driver from being used to predict the target metric. For example, in a case where a prediction driver is determined to have a low correlation to the target metric, the user may choose to remove the prediction driver from the dataset used to predict the target metric. As illustrated, in one example, the refine prediction drivers screen 602 may provide the user with the ability to check or uncheck boxes according to whether the user believes the prediction driver 606 will be useful in predicting the target metric.

In an example, each box is initially selected for use in performing predictive analytics by default and the user may unselect various boxes as desired. In another example, the refine drivers tool may be used to make an initial determination whether to use a prediction driver to predict the target metric, and the box associated with the prediction driver displayed in the refine prediction drivers screen 602 may be unchecked. As an illustration shown in FIG. 6, the "Account ID" prediction driver is unchecked to indicate a determination made using the refine drivers tool indicates that the prediction driver would not be of use in predicting the target metric.

In some examples, the refine prediction drivers screen 602 may include an inspect option (not shown) for each prediction driver 606. Selection of the inspect option for a prediction driver 606 will provide the ability, via the refine prediction drivers screen 602, to make further refinements to the prediction driver 606. For example, the user can specify how null values are handled, how to balance categories, and whether or not to use the target metric to generate target metric predictions. In one example, prediction drivers can be grouped into categories or bins to create a combined prediction driver used to generate a predicted target metric. For example, in cases where prediction drivers may be related and/or data for a particular prediction driver may be limited, the data for the prediction drivers can be combined to provide a larger dataset used for predicting the target metric. Illustratively, the GUI 204 can be used to create a bin and data for the prediction drivers can be added to the bin. A user may manually add or remove other prediction drivers into or out of the bin.

Figure 7:
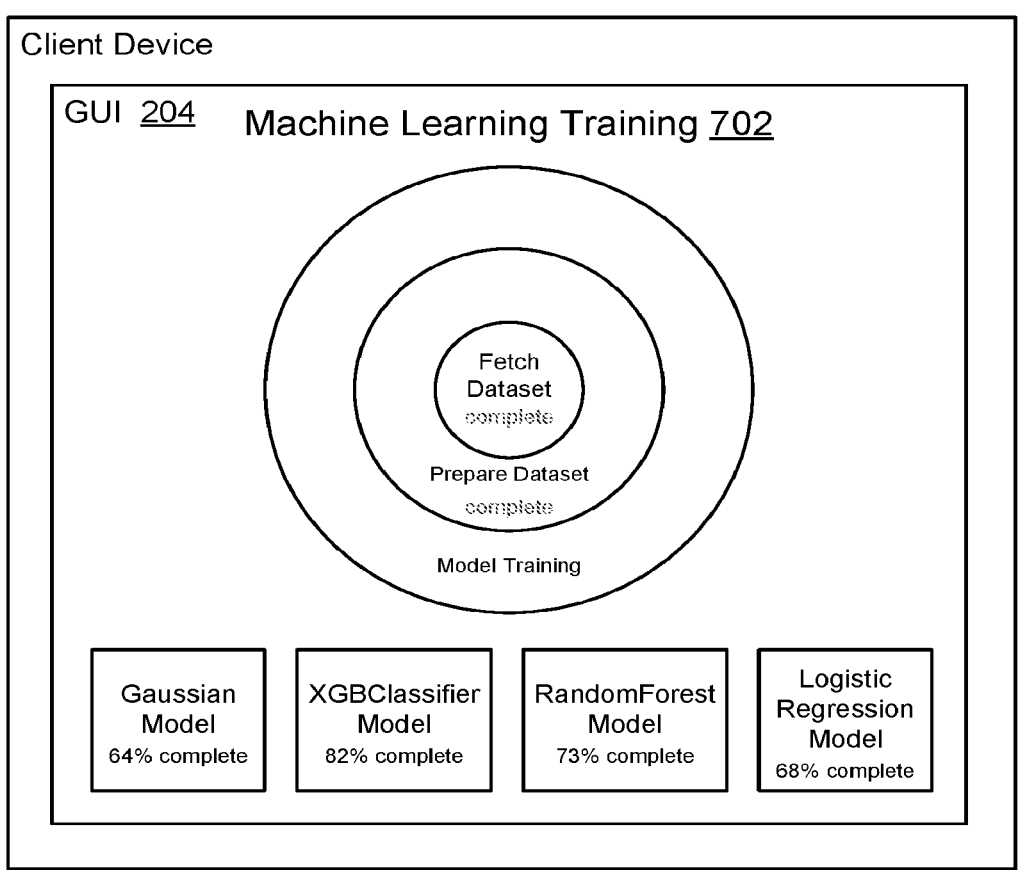
FIG. 7 is a diagram that illustrates an example machine learning training screen of a GUI used to display the progression of training one or more machine learning models.

Once the datasets containing the prediction drivers have been selected and/or unselected as desired, and any predic-tion driver refinements have been made, one or more machine learning models can be trained to predict the target metric using the datasets. During the training phase, as illustrated in FIG. 7, a machine learning training screen 702 of the GUI 204 can be used to display the progression of training one or more machine learning models. For example, as illustrated, the GUI 204 can display status information for various processes. In some examples, the machine learning training screen 702 may include a "deep dive" option (not shown) that provides the user with a visualization of more complex information regarding the analytic calculations being performed on the data (e.g., information associated with a particular machine learning algorithm being used to train a machine learning model).

Figure 8A:
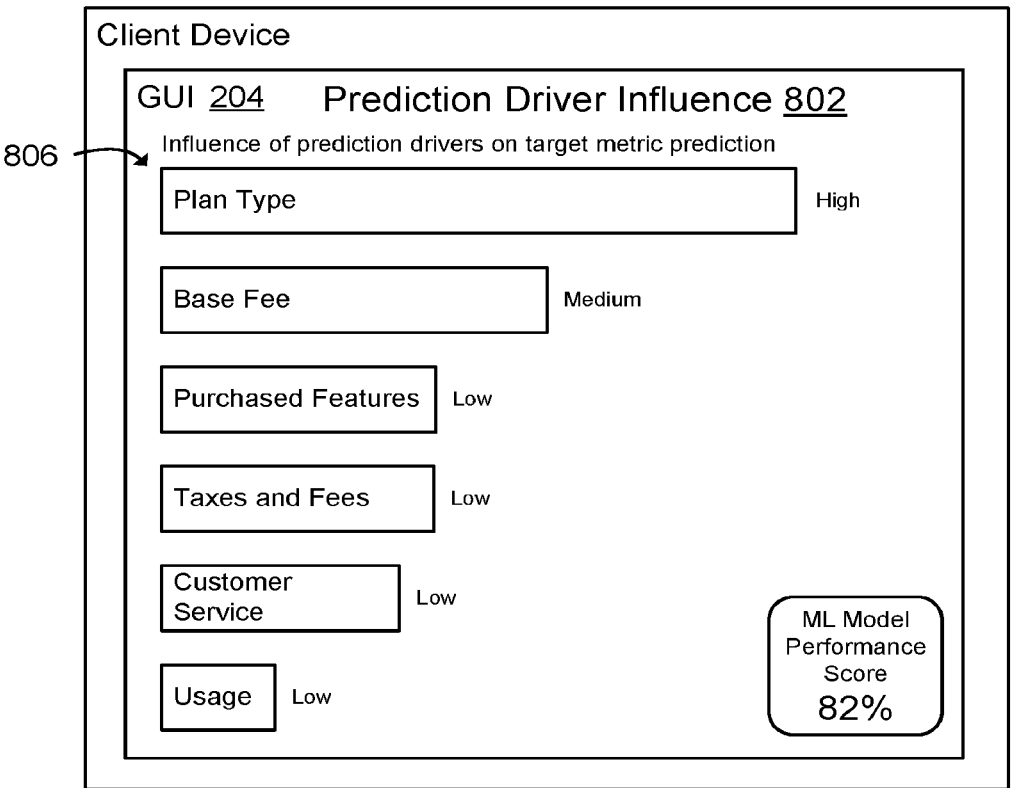
FIGS. 8A-B are diagrams illustrating example prediction driver influence screens of a GUI used to display analysis results for prediction driver influence.
Figure 8B:
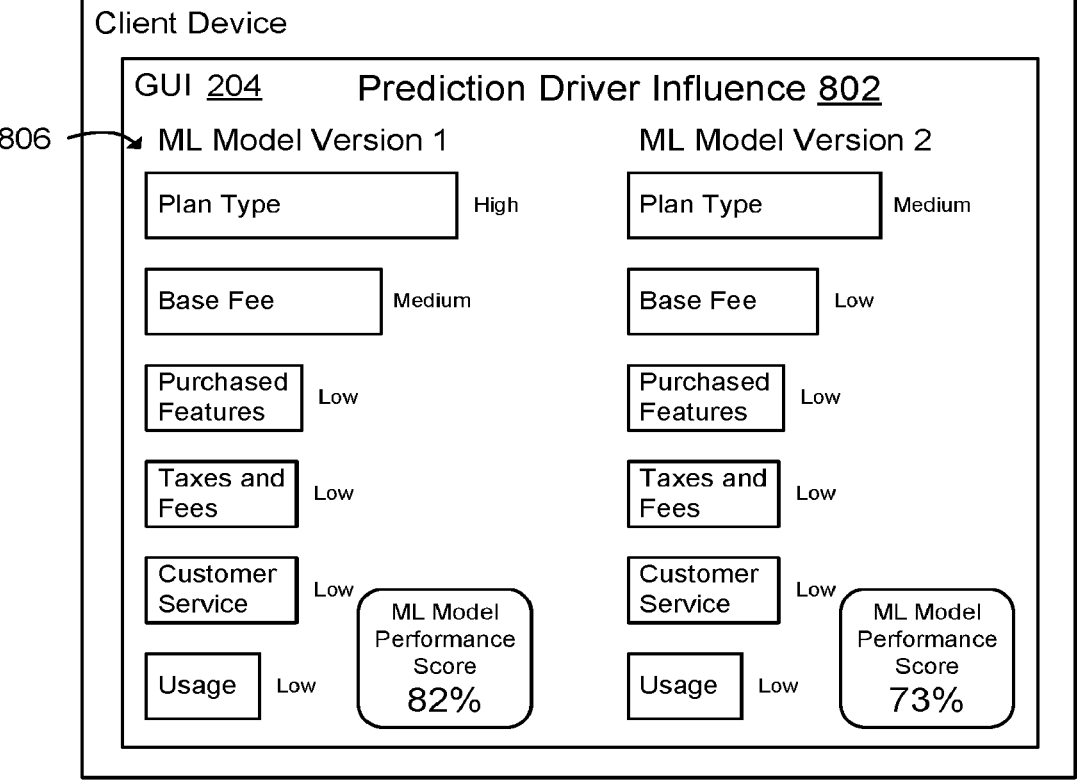
Figure 9:
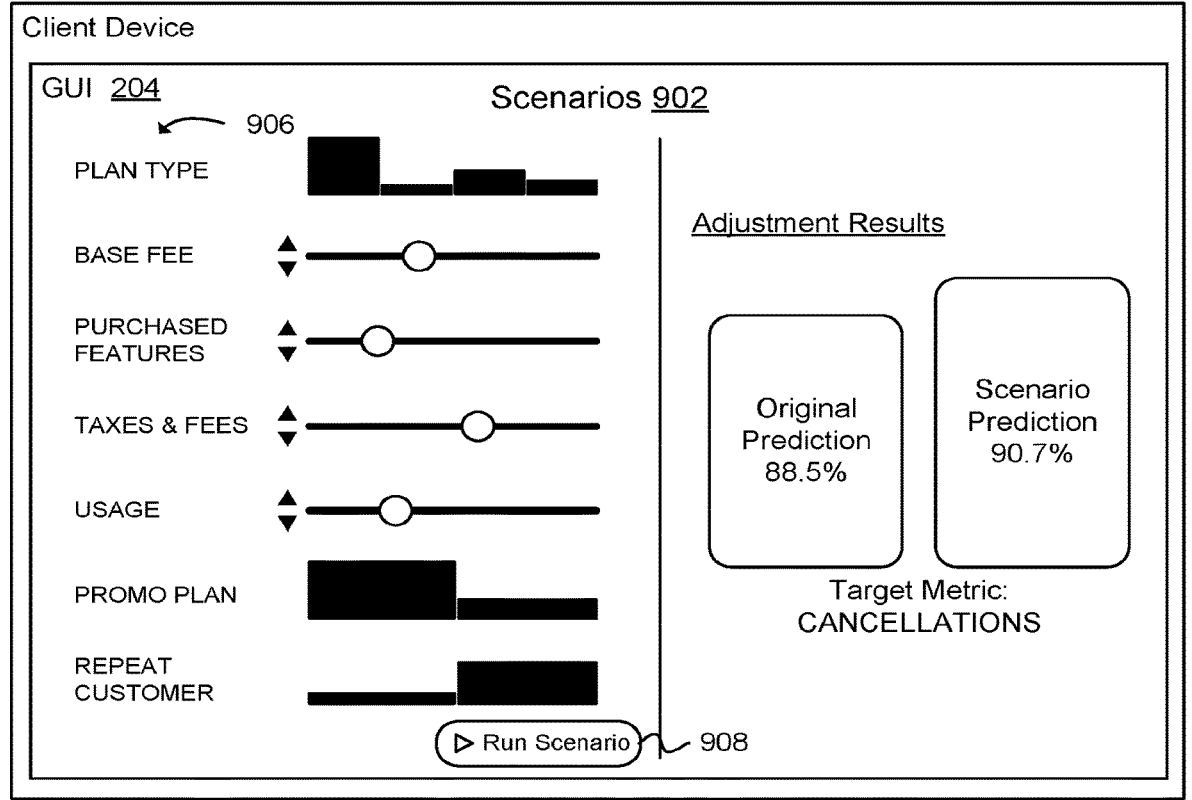
FIG. 9 is a diagram illustrating an example scenarios screen of a GUI used to modify various prediction drivers and execute a machine learning model using the modified prediction drivers.

After training a machine learning model, the user can be provided with analysis for a prediction driver's influence on predicting the target metric. As shown in FIGS. 8A-B, the analysis can be displayed to a prediction driver influence screen 802 of the GUI 204 to allow the user to review the analysis results for prediction driver influence. In one example, the prediction drivers 806 can be ranked and displayed in order with the most influential prediction driver being listed at the top of the prediction driver influence screen 802 and the least influential prediction driver being at the bottom of the prediction driver influence screen 802. As illustrated in FIG. 8B, the prediction driver influence screen 802 can be used to compare multiple versions of the machine learning model side-by-side. For example, a user can create multiple versions of the machine learning model by adjust-ing the influence of prediction drivers 806 (as shown in FIG. 9), and analysis for prediction driver influence on predicting the target metric can be performed for each version of the machine learning model, and the analysis can be displayed to the prediction driver influence screen 802. Providing the analysis may help the user to identify performance differ-ences in the machine learning model versions and select a version of the machine learning model based on the perfor-mance differences.

FIG. 9 illustrates a scenario screen 902 of the GUI 204 which can be used to modify various prediction drivers 906 and execute the machine learning model using the modified prediction drivers. As illustrated, the scenarios screen 902 can include various input controls (e.g., slider controls, increment and decrement controls, input boxes, and the like) that can be used to adjust the influence of the prediction drivers 906. An adjustment made to a prediction driver 906 using the input controls can be applied by modifying values in a dataset associated with the prediction driver 906 in proportion to the adjustment of the prediction driver. An adjustment to a prediction driver 906 may adjust a domain, range, mean, average, minimum, or maximum for a set of values in a column of a data set. As an illustration, a slider control associated with a base fee prediction driver 906 can be used to change an original range of values (e.g., $10-$200) to a modified range of values (e.g., $100-$200) and the values can be scaled in the dataset to the new range (e.g., values between $10 and $99 can be overwritten with values between $100-$200).

Figure 10:
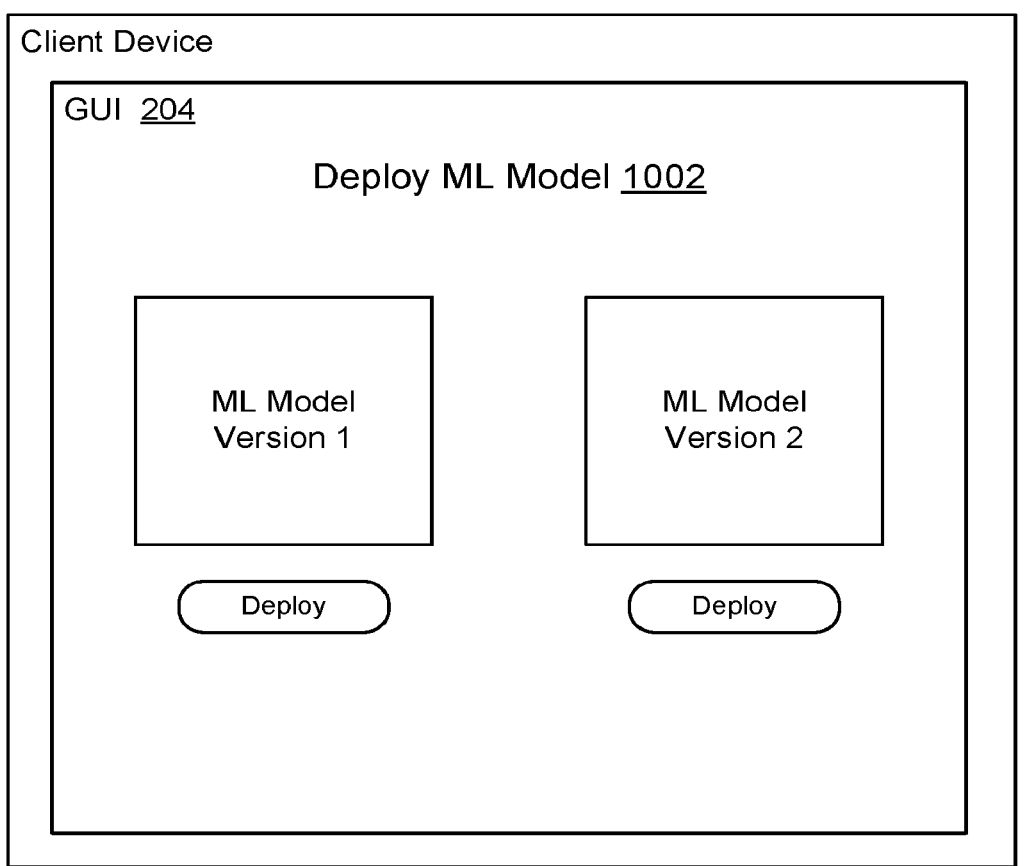
FIG. 10 is a diagram that illustrates an example deploy ML model screen of a GUI used to deploy a machine learning model for production of predicted target metrics.

After making any adjustments, the user can execute a scenario based on the adjustments by selecting a run sce-nario control 908 included in the scenarios screen 902. Analysis for the adjustments to the prediction drivers can be performed, and the analysis results can be displayed to the scenarios screen 902. For example, as shown in FIG. 9, analysis results for the adjustment can be displayed side-by-side with pre-adjustment analysis results. A new version of the machine learning model can be created using adjust-ments made to the prediction drivers 906, and the user may have the option to select a version of the machine learning model to deploy to a production environment, as illustrated in FIG. 10.

Having trained one or more machine learning models, a user can then deploy a machine learning model for produc-tion. FIG. 10 illustrates a deploy ML model screen 1002 of the GUI 204 which can be used to display a list of machine learning model versions created by a user. The user may have the option to rename any version, delete a version, or deploy a version of the machine learning model. Deploying a version of the machine learning model may make the version the "production" version of the machine learning model used to generate prediction data. In one example, the machine learning model can be deployed to computing resources in a service provider environment, and prediction data generated by the machine learning model can be sent to a user data store to allow the user to access the prediction data. Also, in some examples, the machine learning model can be attached to an application programming interface (API) to enable a user access to the machine learning model and prediction data generated by the machine learning model.

FIG. 11 is a flow diagram illustrating an example method 1100 for automating deployment of a machine learning model. As in block 1110, credentials for connecting to a data store containing a plurality of datasets can be received. The credentials can be submitted to an automated ML platform comprising computing resources and tools to create a machine learning model. In one example, a user can submit credentials for a data store using a user interface. As in block 1120, the credentials can be used to connect to the data store, and datasets stored on the data store can be retrieved for use in creating the machine learning model.

As in block 1130, a selection of a target metric to predict using the machine learning model can be received. In one example, the selection of the target metric can be submitted by a user using a user interface. As in block 1140, datasets included in the plurality of datasets that correlate to the target metric can be identified, wherein the datasets can be analyzed to identify an association between the target metric and data contained within the datasets. In one example, the automated ML platform can analyze data elements in a dataset to determine usefulness of the data elements to predict the target metric, and a data element determined not useful to predict the target metric may be removed from the dataset. In another example, a user can provide a selection of a data element that the user has determined not useful to predict the target metric, and the data element can be removed from the dataset.

As in block 1150, the datasets can be input to the machine learning model to train the machine learning model to generate predictions of the target metric. In one example, the target metric can be analyzed to determine a machine learning type (e.g., classification, linear regression, etc.) associated with the target metric and a machine learning model that corresponds to the machine learning type can be selected. In another example, a listing of available machine learning models of various machine learning types can be provided to a user and the user can select a machine learning model that corresponds to a target metric. In some examples, multiple machine learning models can be trained using various machine learning algorithms and the datasets. Performance of the multiple machine learning models to predict the target metric can be determined and the automated ML platform can be used to select one of the machine learning models to deploy to production based on the performance of the machine learning model. For example, prediction scores representing the performance of the machine learning model to predict the target metric can be generated and the prediction scores can be used to select the machine learning model. In another example, a user, via a user interface, can provide a selection of a machine learning model included in the multiple machine learning models based on the performance of the machine learning model.

In one example, a first version of the machine learning model can be trained using the datasets. One or more values in a dataset associated with a prediction driver can be modified to create a modified dataset, and a second version of the machine learning model can be trained using the modified dataset. Performance of the versions of the machine learning model can be compared and a version of the machine learning model can be selected based on the performance of the machine learning model. For example, performance information can be provided to a user and the user, via a user interface, can provide a selection of a version of the machine learning model to deploy to production.

In some examples, after training a machine learning model, the influence of prediction drivers to generate a prediction of the target metric can be determined, and analysis results of the influence of the prediction drivers to predict the target metric can be provided to a user to allow the user to adjust a prediction driver based in part on the analysis results. In one example, the prediction drivers can be ranked based on the influence of the prediction drivers to generate the prediction of the target metric. An adjustment to a prediction driver can be received from the user, and values in the datasets associated with the prediction driver can be modified in proportion to the adjustment of the prediction driver. For example, applying the adjustment to the prediction driver can include removing and creating a plurality values associated with the prediction driver in proportion to the adjustment of the prediction driver. Thereafter, the datasets that include the modified values can be input to the machine learning model and a determination of the impact of the adjustment to the prediction driver on predicting the target metric can be made. Analysis results of the impact of the adjustment to the prediction driver on predicting the target metric can be provided to the user, who can use the analysis results to accept the adjustment to the prediction driver or further refine the prediction driver.

As in block 1160, the machine learning model can be deployed to computing resources in a service provider environment to generate predictions associated with the target metric. Prediction data generated by the machine learning model can be sent to a user data store, or an API can be provided to the user to allow access to the prediction data. In another example, the machine learning model can be deployed to a user's computing resources, such as a user's data center. In one example, when the machine learning model is executed, influence values of prediction drivers to predict the target metric can be captured, and the influence values can be synchronized to datasets associated with the prediction drivers stored in a user data store.

Figure 12:
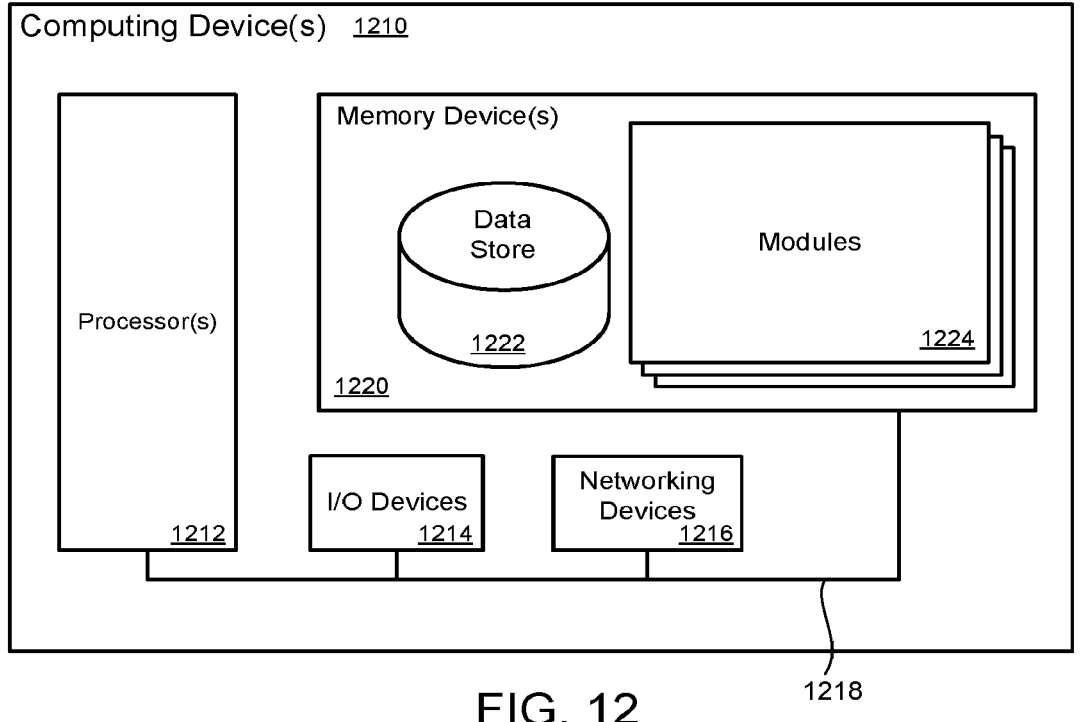
FIG. 12 is block diagram illustrating an example of a computing device that can be used to execute a method for automating training and deployment of a machine learning model.

FIG. 12 illustrates a computing device 1210 on which modules of this technology may execute. A computing device 1210 is illustrated on which a high level example of the technology may be executed. The computing device 1210 may include one or more processors 1212 that are in communication with memory devices 1220. The computing device 1210 may include a local communication interface 1218 for the components in the computing device. For example, the local communication interface 1218 may be a local data bus and/or any related address or control busses as may be desired.

The memory device 1220 may contain modules 1224 that are executable by the processor(s) 1212 and data for the modules 1224. In one example, the memory device 1220 can include a dataset module, training module, performance module, deployment module, and other modules. The modules 1224 may execute the functions described earlier. A data store 1222 may also be located in the memory device 1220 for storing data related to the modules 1224 and other applications along with an operating system that is executable by the processor(s) 1212.

Other applications may also be stored in the memory device 1220 and may be executable by the processor(s) 1212. Components or modules discussed in this description that may be implemented in the form of software using high-level programming languages that are compiled, interpreted or executed using a hybrid of the methods.

The computing device may also have access to I/O (input/output) devices 1214 that are usable by the computing devices. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor(s) 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory device 1220 may represent multiple memory units that operate in parallel to the processing circuits. This may provide parallel processing channels for the processes and data in the system. The local communication interface 1218 may be used as a network to facilitate communication between any of the multiple processors and multiple memories. The local communication interface 1218 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A method comprising:
   determining, based on a selection of a target metric, one or more data records associated with a prediction driver for the target metric;
   causing, based on the selection, a first machine learning model to output a first prediction score for the target metric, wherein the first prediction score is based on the one or more data records and the prediction driver;
   receiving an adjustment to an amount of influence for the prediction driver, wherein the adjustment causes at least one value stored in each of the one or more data records to be replaced with a substitute value, and wherein the substitute value for each of the one or more data records is based on the at least one value stored in the corresponding data record and the adjustment to the amount of influence for the prediction driver;
   causing, based on the adjustment and the substitute value for each of the one or more data records, a second machine learning model to output a second prediction score for the target metric; and
   storing, based on a further selection, the first prediction score or the second prediction score, wherein the further selection is indicative of the first machine learning model or the second machine learning model.

2. The method of claim 1, wherein determining the one or more data records associated with the prediction driver for the target metric comprise: determining, based on a selection received via a graphical user interface (GUI), the one or more data records, wherein the GUI comprises at least one input control, and wherein receiving the adjustment to the amount of influence for the prediction driver comprises: receiving, via the at least one input control, the adjustment to the amount of influence for the prediction driver.

3. The method of claim 2, wherein the at least one input control of the GUI comprises one or more of: a slider, an increment control, a decrement control, or an input box.

4. The method of claim 1, wherein the second machine learning model comprises another version of the first machine learning model that is trained based on the substitute value for each of the one or more data records.

5. The method of claim 1, wherein the adjustment to the amount of influence for the prediction driver comprises an adjustment to a weight, or to a degree of influence, associated with the prediction driver.

6. The method of claim 1, further comprising modifying, in proportion to the adjustment to the amount of influence for the prediction driver, the at least one value within the one or more data records.

7. The method of claim 1, further comprising:

training, based on the one or more data records, the first machine learning model; and training, based on the substitute value for each of the one or more data records, the second machine learning model.

8. An apparatus comprising:

one or more processors; and memory storing processor-executable instructions that, when executed by the one or more processors, cause the apparatus to:

determine, based on a selection of a target metric, one or more data records associated with a prediction driver for the target metric;

cause, based on the selection, a first machine learning model to output a first prediction score for the target metric, wherein the first prediction score is based on the one or more data records and the prediction driver;

receive an adjustment to an amount of influence for the prediction driver, wherein the adjustment causes at least one value stored in each of the one or more data records to be replaced with a substitute value, and wherein the substitute value for each of the one or more data records is based on the at least one value stored in the corresponding data record and the adjustment to the amount of influence for the prediction driver;

cause, based on the adjustment and the substitute value for each of the one or more data records, a second machine learning model to output a second prediction score for the target metric; and store, based on a further selection received, the first prediction score or the second prediction score, wherein the further selection is indicative of the first machine learning model or the second machine learning model.

9. The apparatus of claim 8, wherein the processor-executable instructions that cause the apparatus to determine the one or more data records associated with the prediction driver for the target metric further cause the apparatus to determine, based on a selection received via a graphical user interface (GUI), the one or more data records, wherein the GUI comprises at least one input control, and wherein the processor-executable instructions that cause the apparatus to receive the adjustment to the amount of influence for the prediction driver further cause the apparatus to: receive, via the at least one input control, the adjustment to the amount of influence for the prediction driver.

10. The apparatus of claim 9, wherein the at least one input control of the GUI comprises one or more of: a slider, an increment control, a decrement control, or an input box.

11. The apparatus of claim 8, wherein the second machine learning model comprises another version of the first machine learning model that is trained based on the substitute value for each of the one or more data records.

12. The apparatus of claim 8, wherein the adjustment to the amount of influence for the prediction driver comprises an adjustment to a weight, or to a degree of influence, associated with the prediction driver.

13. The apparatus of claim 8, wherein the processor-executable instructions further cause the apparatus to modify, in proportion to the adjustment to the amount of influence for the prediction driver, the at least one value within the one or more data records.

14. The apparatus of claim 8, wherein the processor-executable instructions further cause the apparatus to:

train, based on the one or more data records, the first machine learning model; and train, based on the substitute value for each of the one or more data records, the second machine learning model.

15. One or more non-transitory computer-readable media storing processor-executable instructions that, when executed by one or more processors of at least one computing device, cause the at least one computing device to:

determine, based on a selection of a target metric, one or more data records associated with a prediction driver for the target metric;

cause, based on the selection, a first machine learning model to output a first prediction score for the target metric, wherein the first prediction score is based on the one or more data records and the prediction driver;

receive an adjustment to an amount of influence for the prediction driver, wherein the adjustment causes at least one value stored in each of the one or more data records to be replaced with a substitute value, and wherein the substitute value for each of the one or more data records is based on the at least one value stored in the corresponding data record and the adjustment to the amount of influence for the prediction driver;

cause, based on the adjustment and the substitute value for each of the one or more data records, a second machine learning model to output a second prediction score for the target metric; and store, based on a further selection received, the first prediction score or the second prediction score, wherein the further selection is indicative of the first machine learning model or the second machine learning model.

16. The one or more non-transitory computer-readable media of claim 15, wherein the processor-executable instructions that cause the at least one computing device to determine the one or more data records associated with the prediction driver for the target metric further cause the at least one computing device to determine, based on a selection received via a graphical user interface (GUI), the one or more data records, wherein the GUI comprises at least one input control, and wherein the processor-executable instructions that cause the at least one computing device to receive the adjustment to the amount of influence for the prediction driver further cause the at least one computing device to: receive, via the at least one input control, the adjustment to the amount of influence for the prediction driver.

17. The one or more non-transitory computer-readable media of claim 16, wherein the at least one input control of the GUI comprises one or more of: a slider, an increment control, a decrement control, or an input box.

18. The one or more non-transitory computer-readable media of claim 15, wherein the second machine learning model comprises another version of the first machine learning model that is trained based on the substitute value for each of the one or more data records.

19. The one or more non-transitory computer-readable media of claim 15, wherein the adjustment to the amount of influence for the prediction driver comprises an adjustment to a weight, or to a degree of influence, associated with the prediction driver.

20. The one or more non-transitory computer-readable media of claim 15, wherein the processor-executable instructions further cause the at least one computing device to modify, in proportion to the adjustment to the amount of influence for the prediction driver, the at least one value within the one or more data records.

\* \* \* \* \*